(12) United States Patent
Leggett et al.

(10) Patent No.: US 7,857,560 B2
(45) Date of Patent: Dec. 28, 2010

(54) SELF-TENSIONING TIE DOWN ASSEMBLY

(76) Inventors: Timothy S. Leggett, 5623 Rodeo Drive, Kamloops, BC (CA) V1S 2A3; Casey K Dundass, 1940 Ash Wynd, Kamloops, BC (CA) V1S 1X5; Andrew R. Ross, 1933 Ash Wynd, Kamloops, BC (CA) V1S 1X5

( * ) Notice: Subject to any disclaimer, the term of this patent is extended or adjusted under 35 U.S.C. 154(b) by 0 days.

(21) Appl. No.: 12/093,944

(22) PCT Filed: Nov. 16, 2006

(86) PCT No.: PCT/CA2006/001881

§ 371 (c)(1),
(2), (4) Date: May 15, 2008

(87) PCT Pub. No.: WO2007/056860

PCT Pub. Date: May 24, 2007

(65) Prior Publication Data

US 2008/0304932 A1 Dec. 11, 2008

(30) Foreign Application Priority Data

Nov. 16, 2005 (CA) .................................. 2527162

(51) Int. Cl.
*B60P 7/08* (2006.01)
(52) U.S. Cl. ........................... 410/103; 410/100; 410/34
(58) Field of Classification Search .................. 410/12, 410/34, 97, 100, 103; 254/213, 217, 223, 254/228, 367, 364, 369, 376; 242/412
See application file for complete search history.

(56) References Cited

U.S. PATENT DOCUMENTS 4,036,476 A * 7/1977 Douce et al. .................. 410/34
4,045,002 A 8/1977 Miller
5,853,164 A 12/1998 Hunt (Continued)

FOREIGN PATENT DOCUMENTS

CA          1065837          11/1979

(Continued)

*Primary Examiner*—Stephen Gordon
(74) *Attorney, Agent, or Firm*—C. Larry Kyle; Nexus Law Group LLP (57) ABSTRACT

A self-tensioning tie down assembly (2) for tightening retaining straps (70) about winches (64) securing cargo (71) on a carrier (73). The assembly (2) has an actuator (15) connected to a pneumatic circuit (61) and providing reciprocating linear motion to a torque linkage (60) connected to the winch (64). The torque linkage (60) has a wrap spring clutch (17) connectable to the ratchet wheel (7) of the winch (64) and a connector arm (11) connected to the actuator (15). The torque linkage (60) transmits the linear motion to the winch (64) as a corresponding rotational motion. The required tension level of the retaining strap (70) is pre-set. Pressure within the circuit (61) drives the actuator (15) thereby actuating the torque linkage (60) which tightens the strap (70) on the winch (64) until the tension level is reached. The flow of pressure to the actuator (15) is controlled by a control valve (18) having a valve lever (19) that is toggled back and forth between an extend position and a retract position by a pair of opposed trip mounts (31, 32) mounted on the connector arm (11).

16 Claims, 12 Drawing Sheets

U.S. PATENT DOCUMENTS

| | | | |
|---|---|---|---|
| 6,015,250 A * | 1/2000 | Walsh et al. | 410/100 |
| 6,048,145 A * | 4/2000 | Pedersen | 410/100 |
| 2004/0155230 A1 | 8/2004 | Fortin | |
| 2007/0269285 A1 | 11/2007 | Leggett et al. | |

FOREIGN PATENT DOCUMENTS

| | | |
|---|---|---|
| CA | 2385491 | 7/2003 |
| DE | 202005013599 U1 | 10/2005 |
| EP | 1371521 A2 | 12/2003 |
| GB | 2128574 A | 5/1984 |
| SE | 305415 | 10/1968 |
| WO | 03013906 A | 2/2003 |
| WO | 2005110810 A1 | 11/2005 |

\* cited by examiner

Fig.10

# SELF-TENSIONING TIE DOWN ASSEMBLY

FIELD OF THE INVENTION

The present invention relates to a self-tensioning tie down assembly, and more particularly to an assembly for automatically tensioning and releasing tie down straps about a winch.

BACKGROUND OF THE INVENTION

Goods are often transported by a carrier having some form of platform or bunk upon which the goods are placed, such as, but not limited to, a flat bed trailer. The goods must be secured in order to prevent any moving or shifting which could damage the goods and cause unsafe driving conditions. Various tie down assemblies have been developed for the purpose of securing goods being transported on a carrier.

The tie down straps are typically fastened and tensioned with the aid of a winch having a manual ratchet mechanism. Such ratchet mechanisms are known in the art, for example, as shown in U.S. Pat. Nos. 4,045,002 and 5,853,164, and may be used for several fastening applications. The inherent limitation with these systems is the lack of monitoring and appropriate automatic adjustment of the strap tension during transit. This problem is a very common concern for flatbed trailers carrying cargo for the transportation industry. Operators are left wondering if they have adequately secured their cargo before departure and especially during transit, when the contents may shift slightly, adversely impacting on the tension of the strap and on the load distribution. Another weakness with the manual ratchet mechanism is the risk of injury to the operator. To manually secure tie downs, operators have to exert large forces, which often lead to physical injury.

An automatic take-up winch is taught in U.S. Pat. No. 4,036,476 to Douce. The Douce device employs an actuating unit that advances the winch by applying force on the teeth of the ratchet wheel, one tooth at a time. While the automatic take-up winch of the '476 patent overcomes the deficiency of the strictly manual winches, it suffers from a number of its own deficiencies. For example, because the Douce winch relies on the direct application of force against a tooth of the ratchet wheel, the force required is very high. The device therefore requires a strong source of pressure, which can be problematic given the small amount of available space below the carrier. In addition, the Douce invention is susceptible to failure as a result of debris build-up on the ratchet wheel teeth since the actuating unit needs to directly engage each tooth. The constant force being applied to the teeth also leads to increased wear of the teeth such that over time they will require replacement. Furthermore, the entire actuating unit and winch is one pre-formed unit such that the actuating unit may not be used in association with the winches that are already mounted on a carrier.

A further strap tensioning system is taught in International Publication Number WO 03/013906 filed by Brunet. The Brunet application teaches a strap winch device for automatically tightening a strap to a pre-selected tension. A number of the winch devices are fitted on a flat bed trailer and are connected to a single fore and aft drive shaft which extends along the side of the trailer. The drive shaft is driven by a motor to tighten any straps that require tightening. Each winch device has a clutch mechanism to prevent the motor from overheating once a set tightening torque threshold has been reached. The device is also equipped with a manual clutch override so that an operator can release the tension of a given winch device whenever necessary. The clutch assembly has a discoid casing having a number of deep cylindrical radial recesses. Spring loaded spheroid bodies are sized to fit into the radial recesses. The discoid casing is fitted within a ring gear powered by the drive shaft. The ring gear has shallow, arcuate recesses within which the spheroid bodies may be fitted. Power from the motor is transferred from the shaft to the ring gear and from the ring gear to the discoid casing. The discoid casing has a small gear wheel anchored to it which in turn transfers rotational force to the tensioning gear thereby tightening the strap. Once the strap has been tightened to a set torque threshold, the radial springs inside the discoid casing will yieldingly move radially inwardly thereby releasing the frictional interlock between the discoid casing and the ring gear. Once this pre-selected tension level has been achieved, while the electric motor continues to rotate the shaft and the ring gear, rotational forces are no longer transferred to the discoid casing.

The Brunet device suffers from a number of drawbacks. It requires power from an electric motor. The motor must be sufficiently powerful to operate all winches at the same time, as they are linked in series. Should the motor fail, none of the winches will work. Similarly, the system will only operate when the motor is running. In addition, the complex gear system and clutch of the Brunet device will make identifying any problems with the system difficult and ongoing maintenance costly and time consuming. The shaft driving the devices runs along the length of the side of the trailer and would be susceptible to having objects getting wrapped around it and hindering its ability to rotate. Finally, it would be difficult to retro-fit existing trailers with the Brunet system due to the complex nature of the mechanism and limited space under the trailer for attachment likely requiring the removal of any existing winches.

Accordingly, it is an object of an embodiment of the present invention to provide an automated tie down device having a torque transfer mechanism that can easily be released without the use of any strenuous effort by the operator.

It is an object of an embodiment of the invention to provide an automated tie down device powered by pneumatics without the use of electronics.

It is a further object of an embodiment of the present invention to overcome the deficiencies noted above. Other objects of the invention will be apparent from the description that follows.

SUMMARY OF THE INVENTION

The invention consists of an apparatus that provides autonomous monitoring as well as an active response to loosening tie down straps. The system is designed such that it is easily integrated to the existing tie down winch/ratchet mechanism that is used extensively in the flatbed transportation industry. The existing tie down winch can still be utilized in its original format when the present invention is disengaged. This provides users with the option to independently adjust and control the method of use for each individual winch.

The invention mimics the torque driven motion that is developed with a traditional human powered torque bar. The invention reduces the required length of the torque bar by increasing the input driving force. The invention consists of coupling a torque linkage with the existing ratchet wheel on a winch assembly. A pneumatically driven actuator powers the torque linkage. One of the members in the linkage is a wrap spring clutch. The actuator produces linear reciprocating motion which is transmitted and converted by the wrap spring clutch into the required torque action; a tightening torque in one direction and freewheel in the other. The ratchet wheel is connected to a spool about which the tie down strap is wrapped. The forced rotation of the ratchet wheel and spool results in the tightening of the tie down strap. In this fashion, the ratchet wheel and spool are tightened one tooth at a time until the strap is light. If the system is not powered, the user can manually employ the existing ratchet mechanism in its non-automated format if so desired.

According to the preferred embodiment of the invention there is provided a self-tensioning tie down assembly for use in automatically tightening a retaining element on a winch securing cargo on a carrier. The tie down assembly comprises a mounting bracket that is connected to the carrier so as to position the assembly adjacent to the winch. An actuator having extended and retracted positions is mounted to the bracket and, when powered, provides reciprocating linear motion between the extended and retracted positions. The actuator is powered by a power source. A linkage having a portion connected to the actuator and another portion connected to the winch transmits a tightening torque to the winch when actuated by the actuator.

In another aspect of the invention, the linkage comprises a connector arm and a wrap spring clutch, the connector arm being connected to the actuator at one end and to the wrap spring clutch at an opposite end. The wrap spring clutch is connected to the winch.

In another aspect of the invention, the winch includes a spool, a ratchet wheel and a pawl, with the wrap spring clutch being connectable to a shaft connected to the ratchet wheel of the winch.

In another aspect of the invention, the actuator comprises a piston in a cylinder, the piston having a rod connected to the linkage, the actuator being actuated by pneumatic pressure, delivery of the pneumatic pressure to the cylinder being controlled by a control valve. The control valve has a valve lever movable back and forth from a first position to a second position, the first position corresponding to an extend mode for said actuator and the second position corresponding to a retract mode for the actuator.

In another aspect of the invention, a pair of trip mounts are mounted on the connector arm, the trip mounts adapted to toggle the valve lever between the first and second positions.

The foregoing was intended as a broad summary only and of only some of the aspects of the invention. It was not intended to define the limits or requirements of the invention. Other aspects of the invention will be appreciated by reference to the detailed description of the preferred embodiment and to the claims.

BRIEF DESCRIPTION OF THE DRAWINGS

These and other features of the invention will become more apparent from the following description in which reference is made to the appended drawings and wherein.

DESCRIPTION OF THE PREFERRED EMBODIMENT

Figure 1:
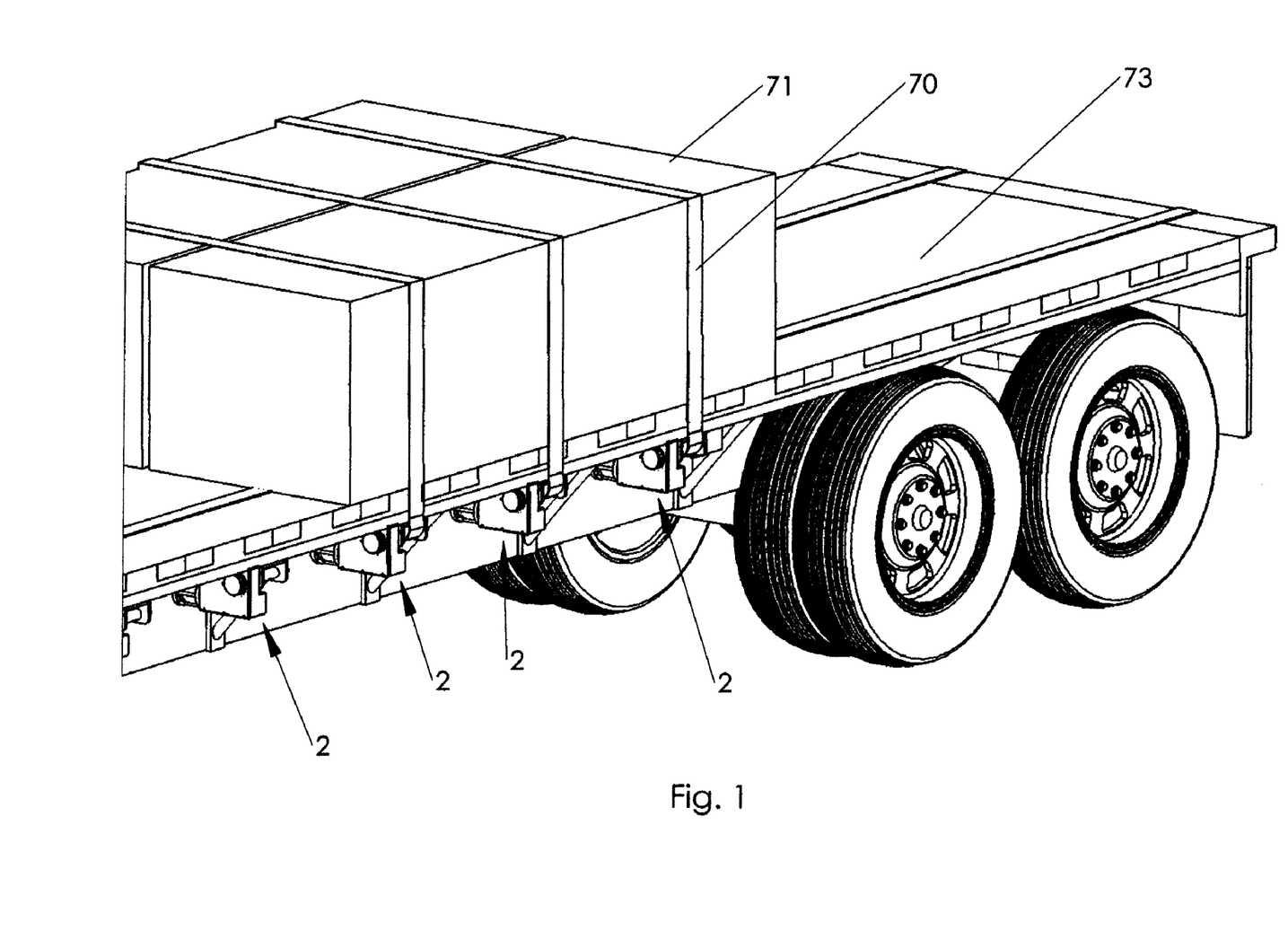
FIG. 1 is a perspective view of a portion of a flat bed trailer equipped with a preferred embodiment of a self-tensioning tie down assembly according to the invention.

A frame trailer 73 carrying cargo 71 restrained by retaining elements 70 and equipped with a plurality of self-tensioning tie down assemblies 2 according to the invention is shown in FIG. 1. The tie down assembly 2 is designed to be used in association with a winch 64 mourned on a carrier. The preferred embodiment of the self-tensioning tie down assembly 2 is shown in FIGS. 2 through 9. Components of the assembly are described below, with identical reference numbers used for identical parts.

Figure 2:
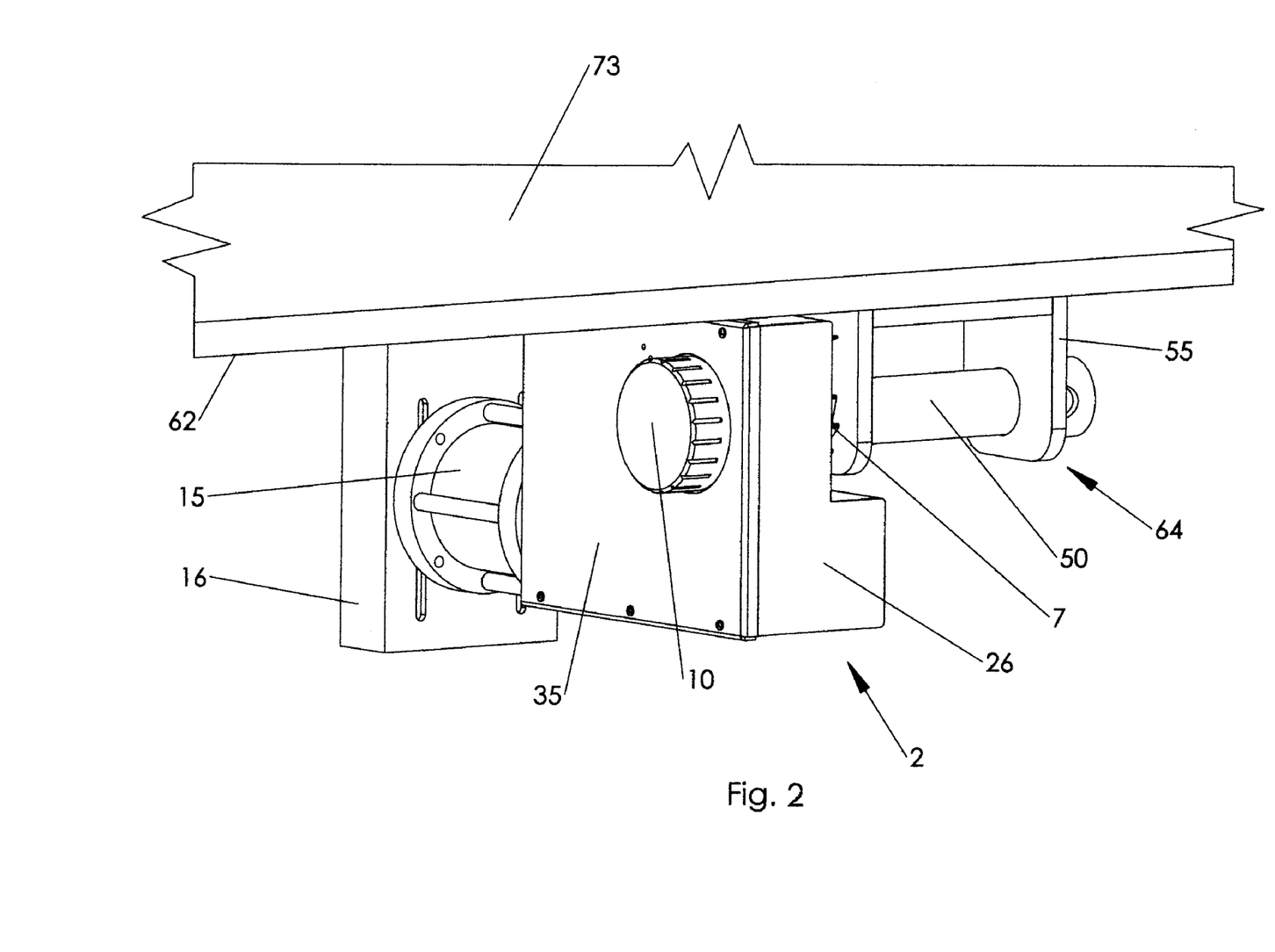
FIG. 2 is a perspective view from the front-left of the preferred embodiment of a self-tensioning tie down assembly according to the invention.
Figure 4:
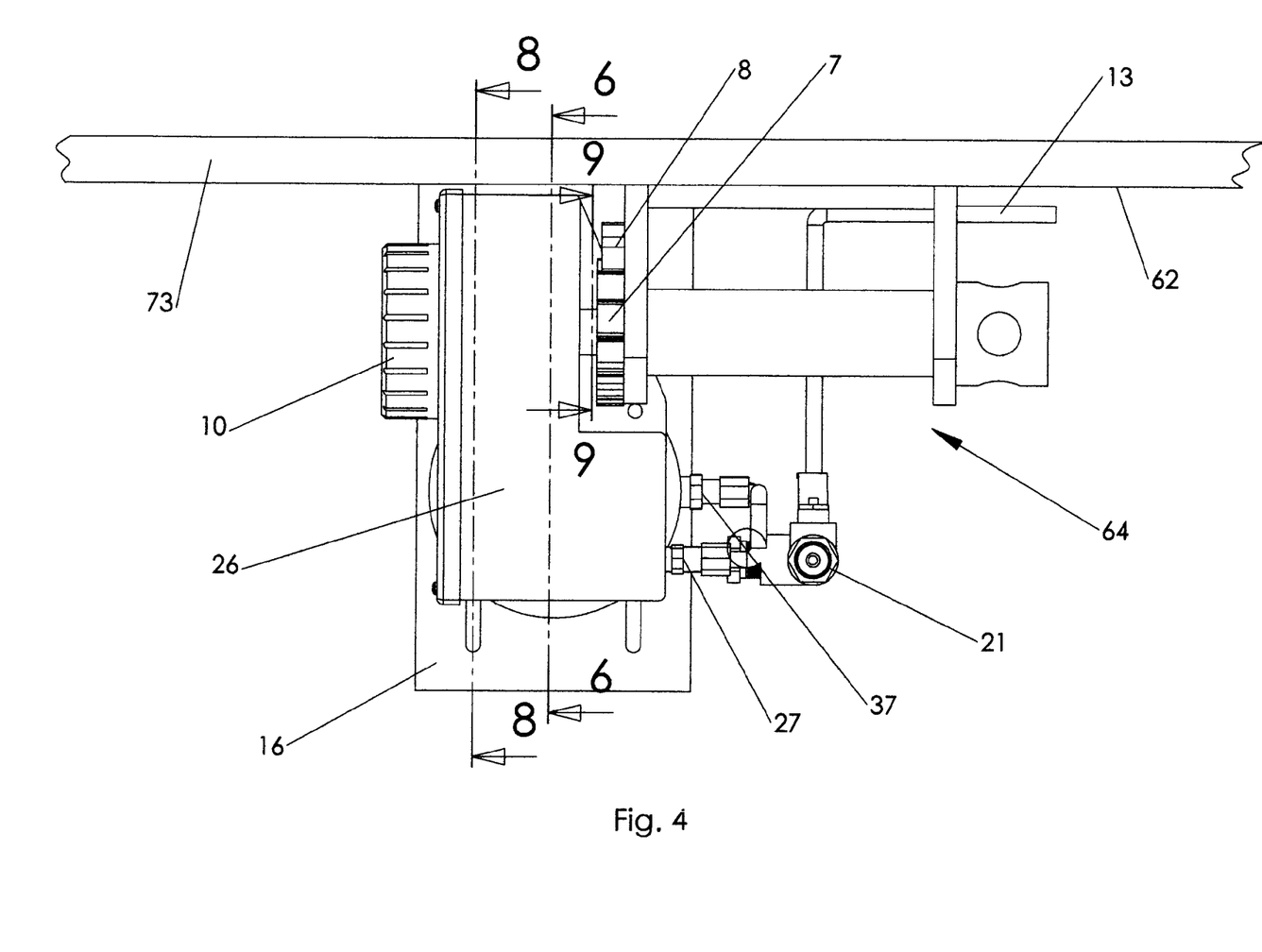
FIG. 4 is a front plan view of the assembly shown in FIG. 2.
Figure 7:
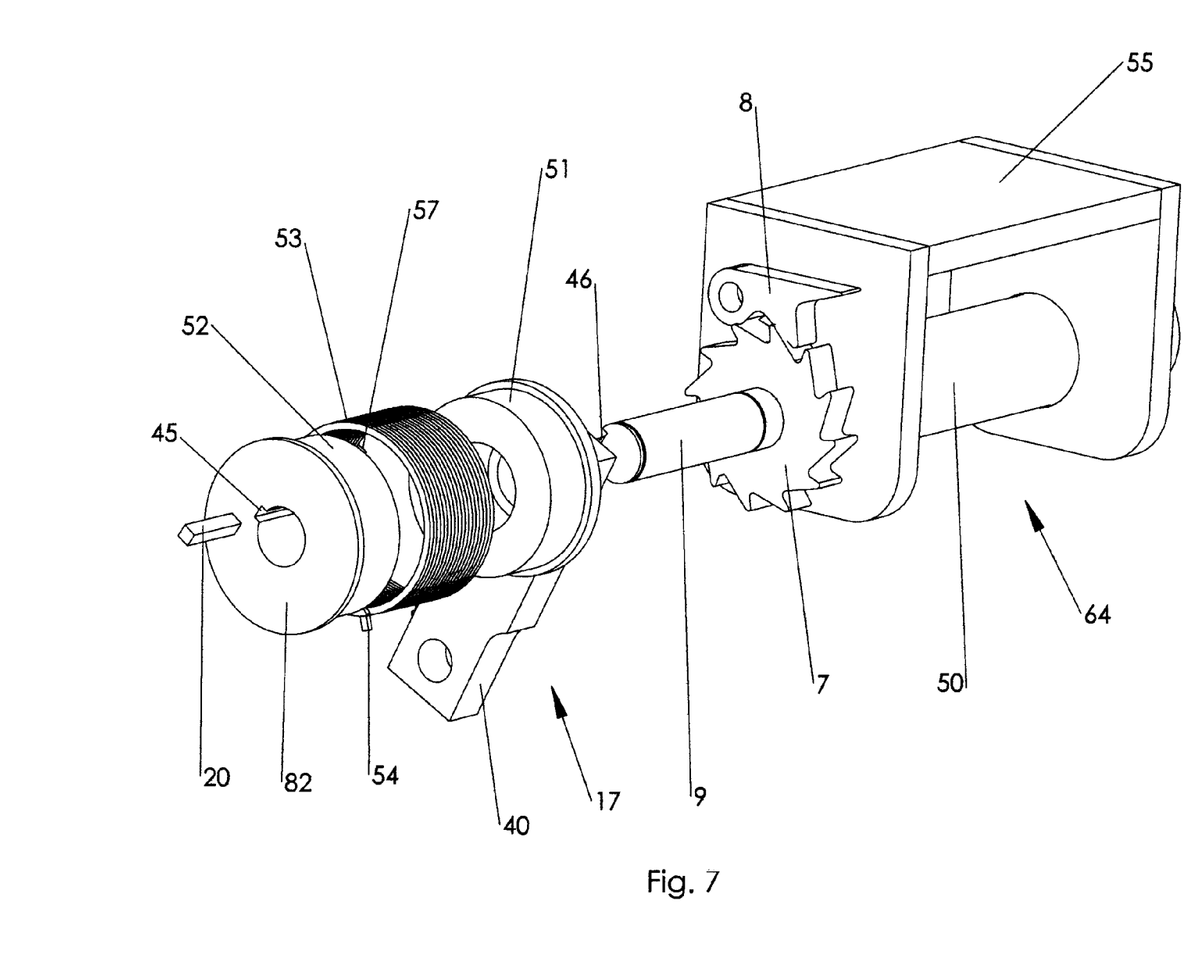
FIG. 7 is an exploded perspective view of the wrap spring clutch shown in FIG. 5.

Referring now to FIG. 2, the tie down assembly 2 can be seen connected to a winch 64. A retaining element 70 used to retain the cargo 71 (shown in FIG. 1) is tightened about the winch. Preferably the retaining elements are tie down straps, but could also take the form of cables, ropes, chains, or the like. The assembly 2 provides automatic tightening of the winch 64 in order to tension the strap and can be used in conjunction with pre-existing winches already mounted on a carrier or can be formed with a winch and the combined assembly and winch then mounted in place on a carrier. Winch 64 has a spool 50 rotatably mounted on a "u"-shaped bracket 55, the bracket 55 being mounted to the underside frame 62 of the trailer 73, such that the "u" is upside down. As best seen in FIGS. 4 and 7, a ratchet wheel 7 is connected to spool 50 and a pawl 8 connected to bracket 55, the ratchet wheel and pawl acting in concert to prevent the unwinding of the winch, with the consequent loosening of the retaining element.

Figure 3:
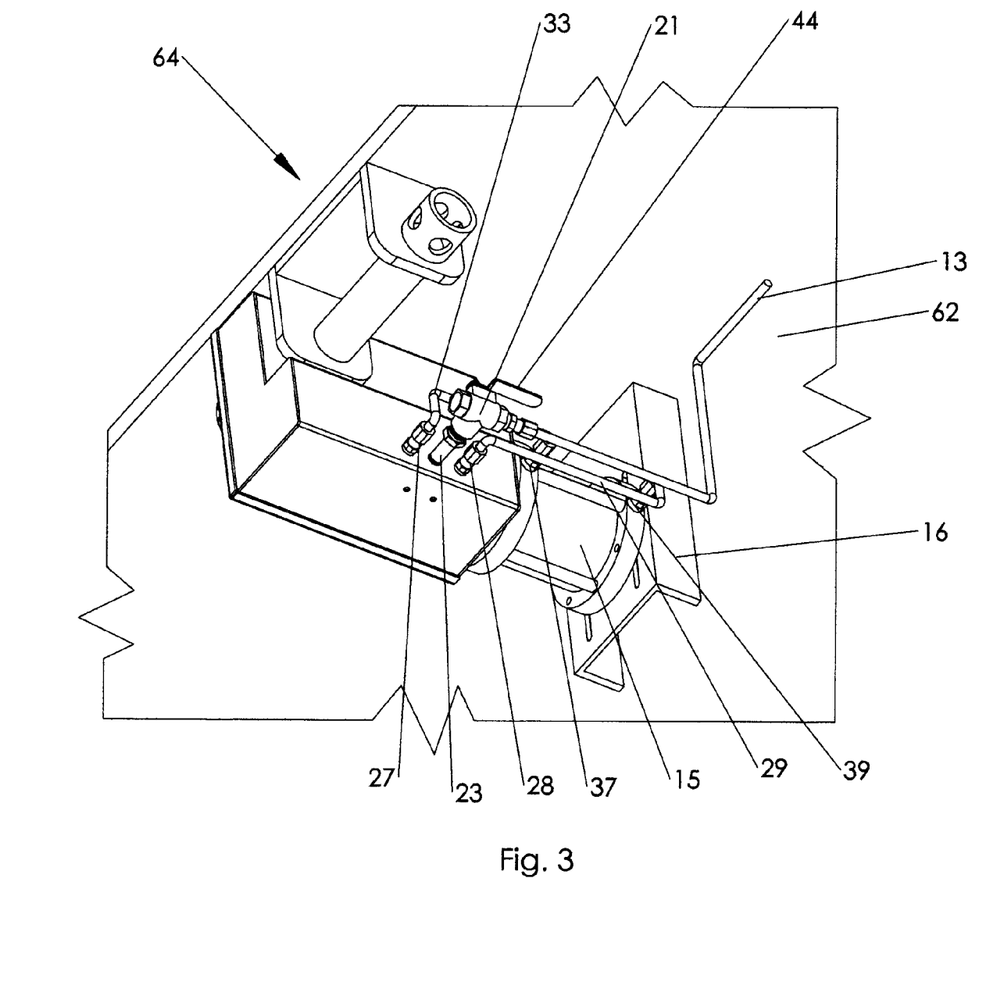
FIG. 3 is a perspective view from the bottom right of the assembly shown in FIG. 2.

The tie down assembly 2 has a mounting bracket 16, which is preferably permanently welded to the underside frame 62 of the flatbed trailer 73 as shown best in FIG. 3. The mounting bracket 16 serves as a rigid mount for an actuator 15. The mounting bracket 16 has two slots 63 that allow for multiple mounting locations of the actuator 15 to accommodate a variety of differing underside frame rails as found on different frame trailers.

Figure 6:
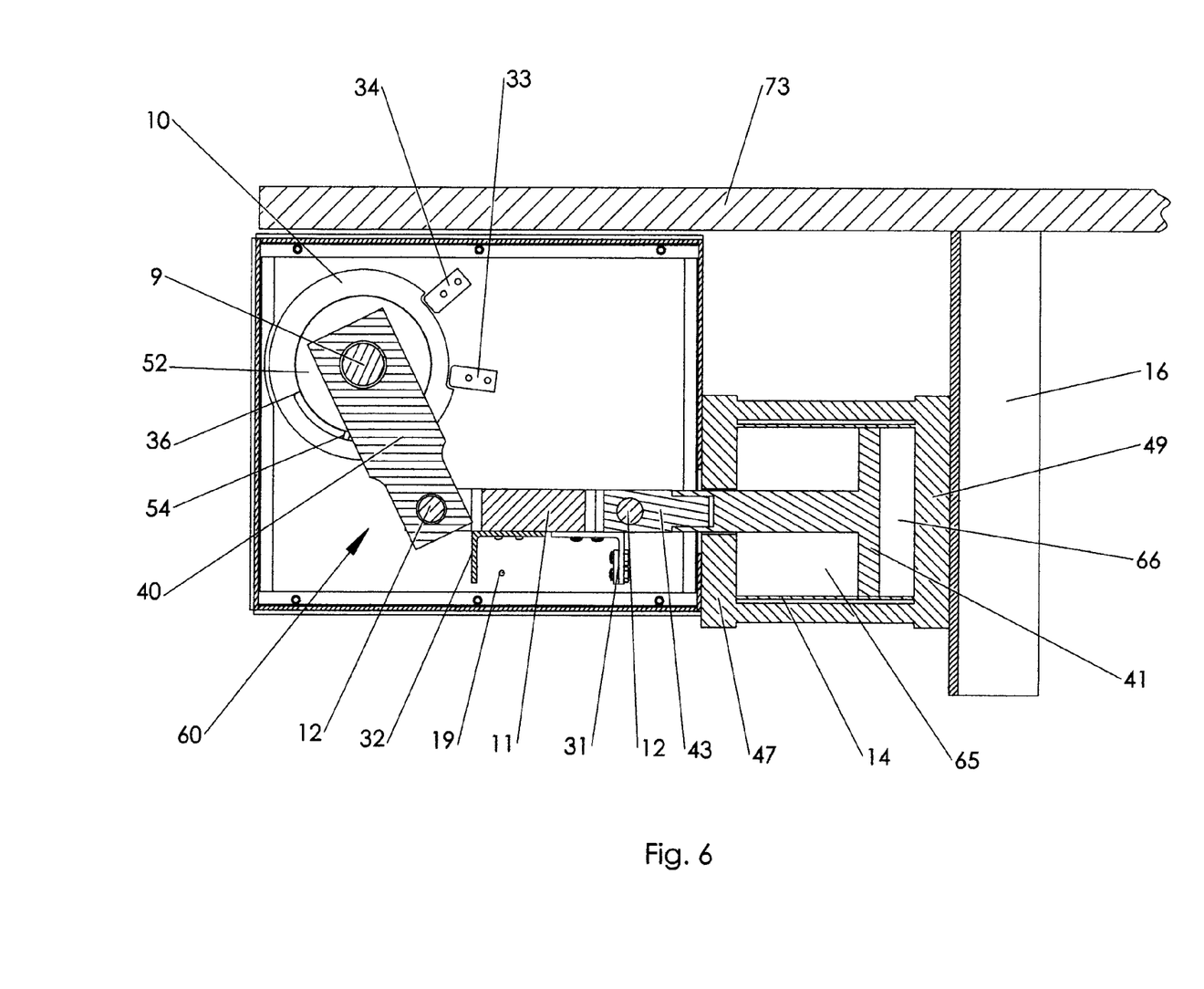
FIG. 6 is a sectional view taken along the line 6-6 shown in FIG. 4.

As shown in FIG. 6, the actuator 15 is preferably a piston 41 in a cylinder 14, the piston having a piston rod 43, the actuator producing a double acting linear motion (extending and retracting the piston rod 43). The body of cylinder 14 is capped at either end by head walls 47 and 49. Piston rod 43 passes through a sealed opening in head wall 47. The piston 41 divides the interior chamber of the cylinder into two chambers: a retract chamber 65 and an extend chamber 66, the chambers being located on either side of the piston 41. The piston 41 and piston rod 43 are preferably driven by pressurised air in a linear reciprocating fashion as will be described in more detail below. It is also contemplated that the actuator could be hydraulically driven or that it could take the form of any linear drive provided it produces a double acting motion, for example an electrical or mechanical linear drive having a lead screw or gear.

Figure 5:
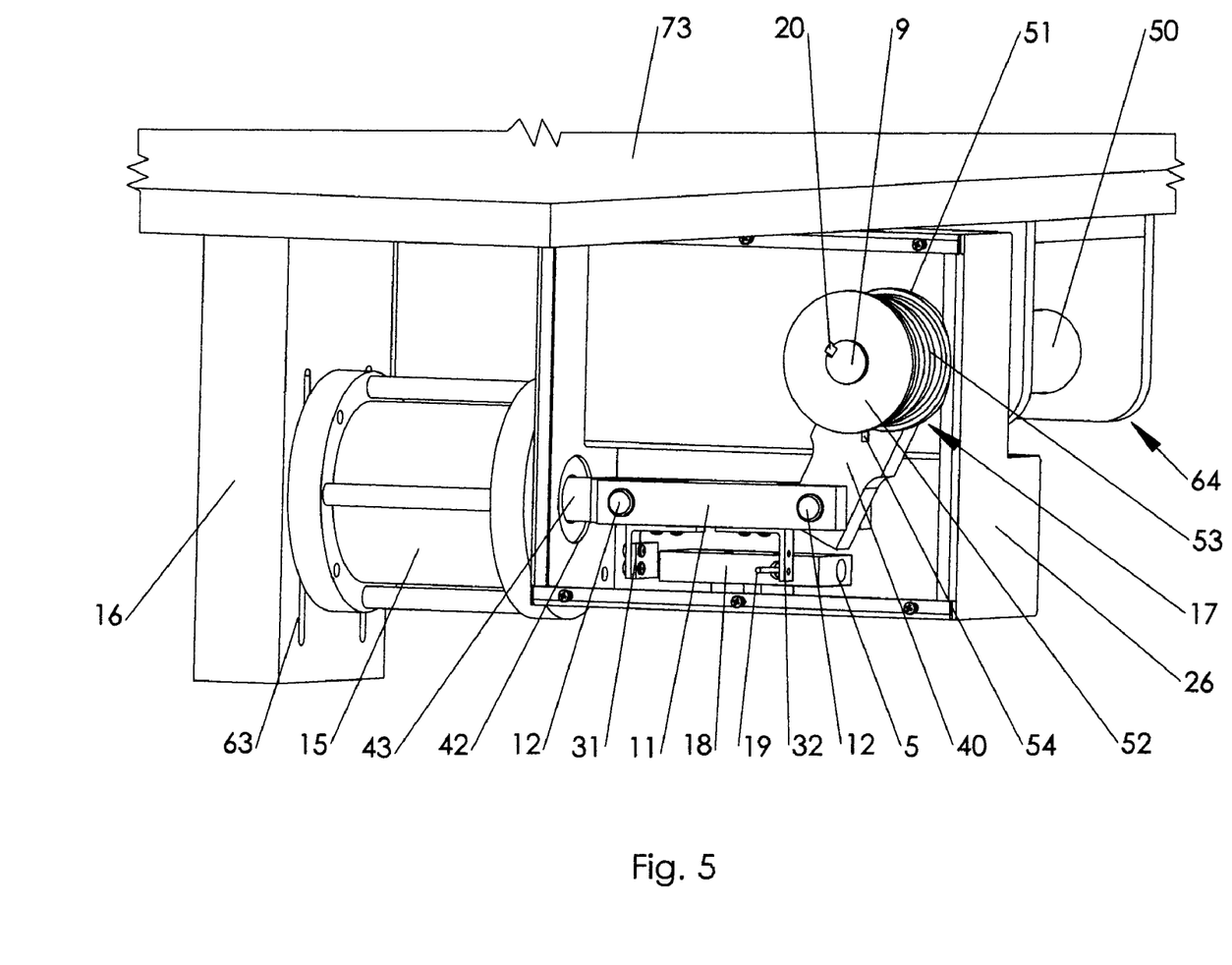
FIG. 5 is a perspective view from the front-left of the assembly shown in FIG. 2 with the cover plate removed.
Figure 5A:
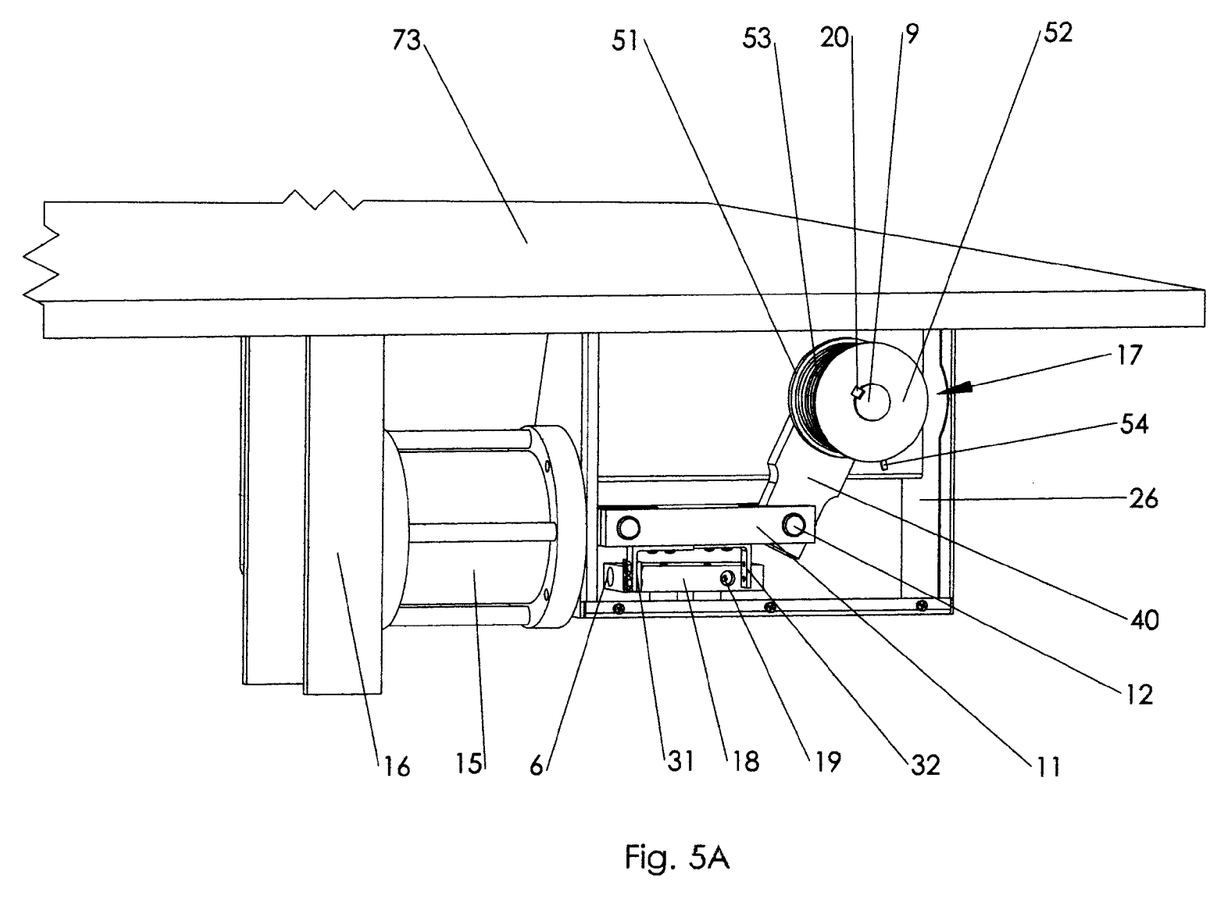
FIG. 5A is a perspective view from the left of the assembly shown in FIG. 5.

Actuator 15 is connected to a housing 26 having a removable cover plate 35. Those portions of the assembly housed within housing 26 are shown in FIGS. 5 and 5A. Piston rod 43 projects into housing 26 through an opening 42. A four-way control valve 18 for controlling the actuator 15 is mounted within housing 26. A torque linkage 60 is also located within the protective enclosure provided by the housing 26. The reciprocating linear motion of the actuator 15 is transmitted as an equivalent reciprocating rotational motion to the winch 64 through the torque linkage 60.

Referring to FIG. 3, it can be seen that control valve 18 has an extend port 28 and a retract port 27, which pass through the side of housing 26. A conduit 33 connects retract port 27 with a retract chamber port 37, which opens into retract chamber 65. Another conduit 29 connects extend port 28 with an extend chamber port 39, which opens into extend chamber 66. Control valve 18 also has an inlet port 23 which also passes through the side of housing 26. Inlet port 23 is connected to a two-way control valve 21, which in turn is connected to a source of pressurised air by way of a conduit 13. Two-way control valve 21 can be opened or closed by way of a valve lever 44. As shown in FIGS. 5 and 5A, control valve 18 also has a pair of exhaust ports 5, 6 and a valve lever 19 which controls the flow of air to the different ports as discussed more fully below.

Figure 10:
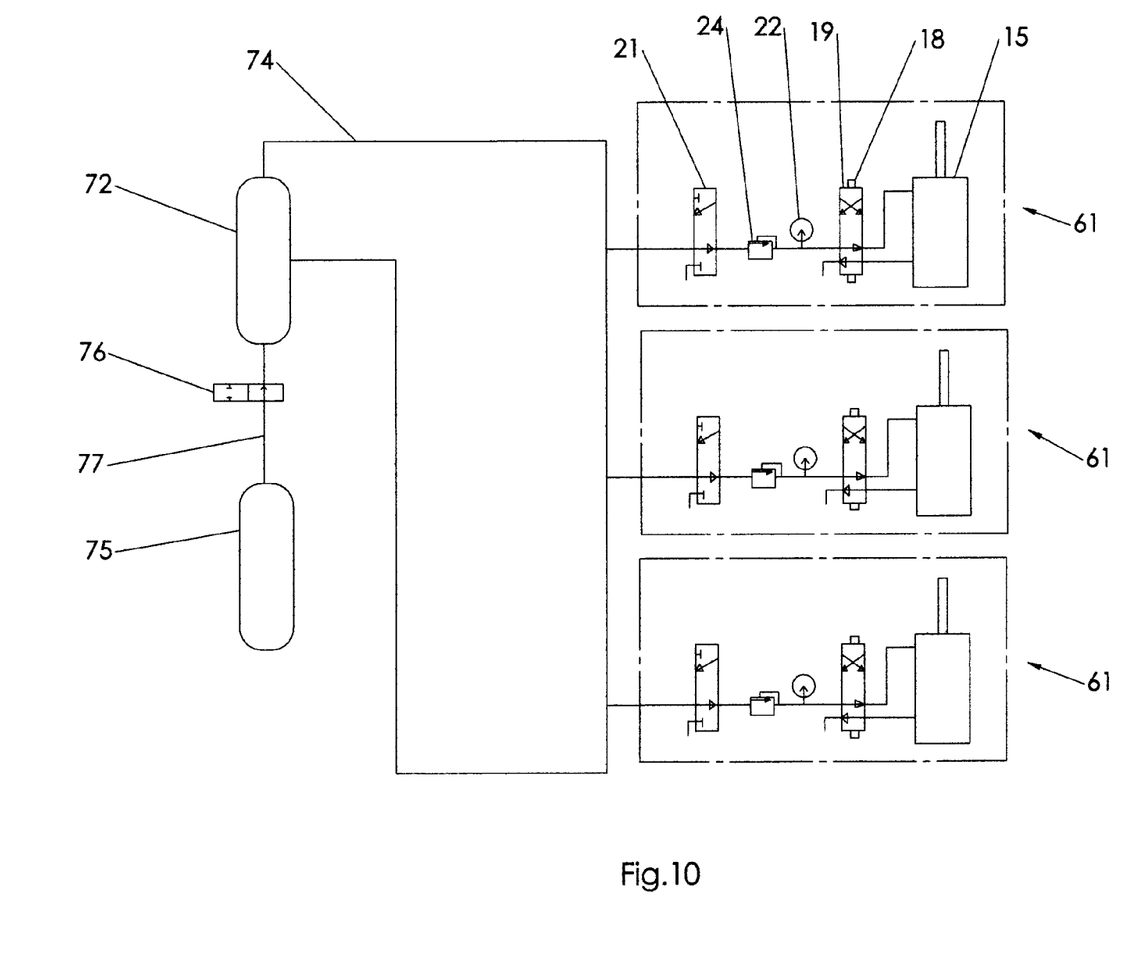
FIG. 10 is a pneumatic circuit diagram of the system according to the invention showing the connection between a plurality of self-tensioning tie down assemblies and a truck air line.

Preferably, the pressurised air for use in the system is contained in a reservoir 72 that is connected to a pressure distribution system in the form of conduit 74 as shown in FIG. 10. The two-way control valve 21 of each self-tensioning tie down assembly 2 is connected to the pressure distribution system 74 and allows the user to activate the tie down assemblies 2 individually as required by the cargo characteristics. The reservoir 72 draws a supply pressure from the existing on-board pneumatic circuit of the vehicle. A main directional control valve 76 separates the reservoir 72 from the air brake supply line 77 and air brake reservoir 75. When the control valve 76 is opened, the reservoir 72 is filled with the same supply pressure as the brake lines 77. The aforementioned system is shown as a pneumatic circuit 61 schematic in FIG. 10. It should be noted that any number of tie down assemblies 2 and their corresponding pneumatic circuits 61 may be employed such that the system is not limited to the diagram shown herein.

Figure 8:
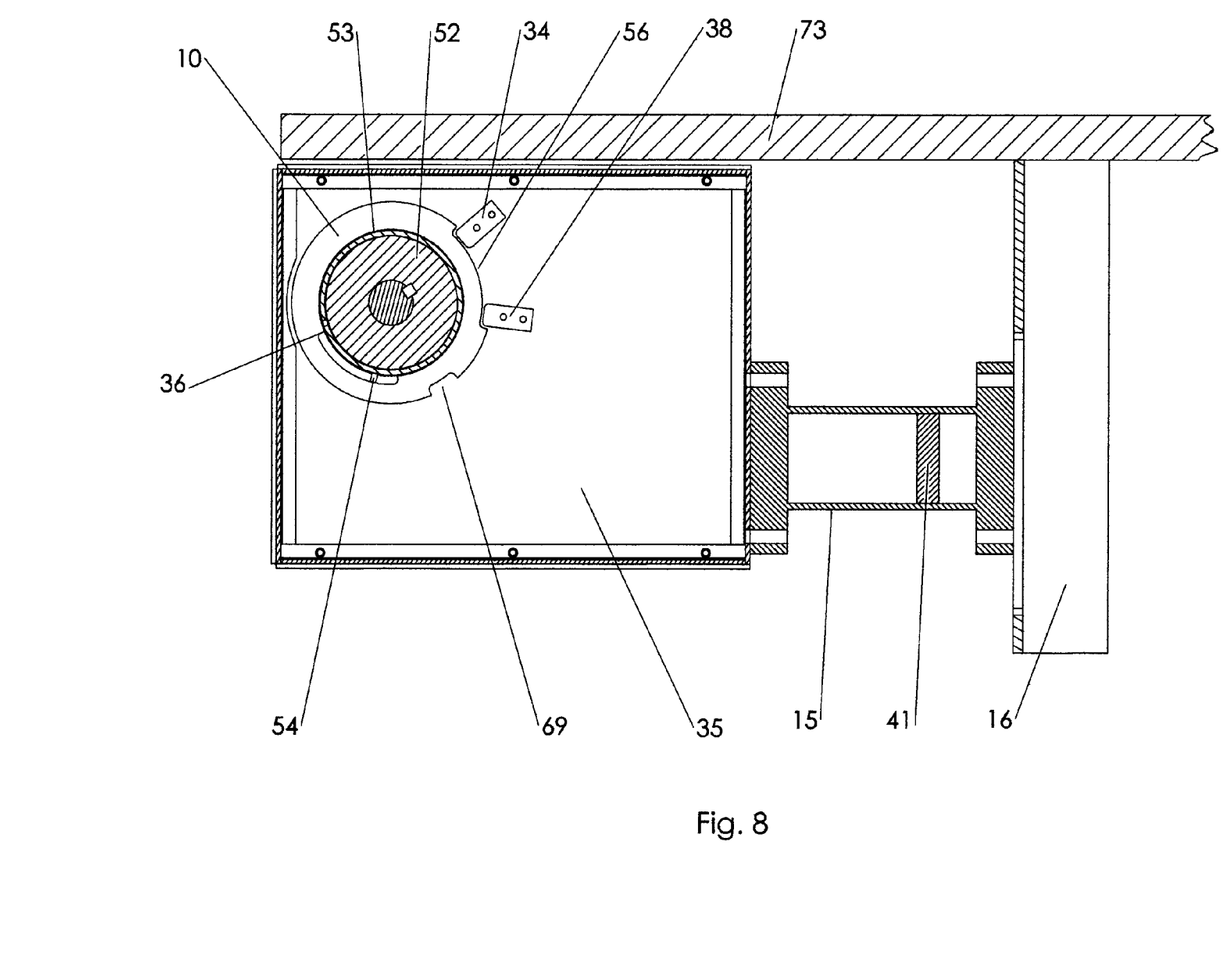
FIG. 8 is a sectional view taken along the line 8-8 shown in FIG. 4.
Figure 8A:
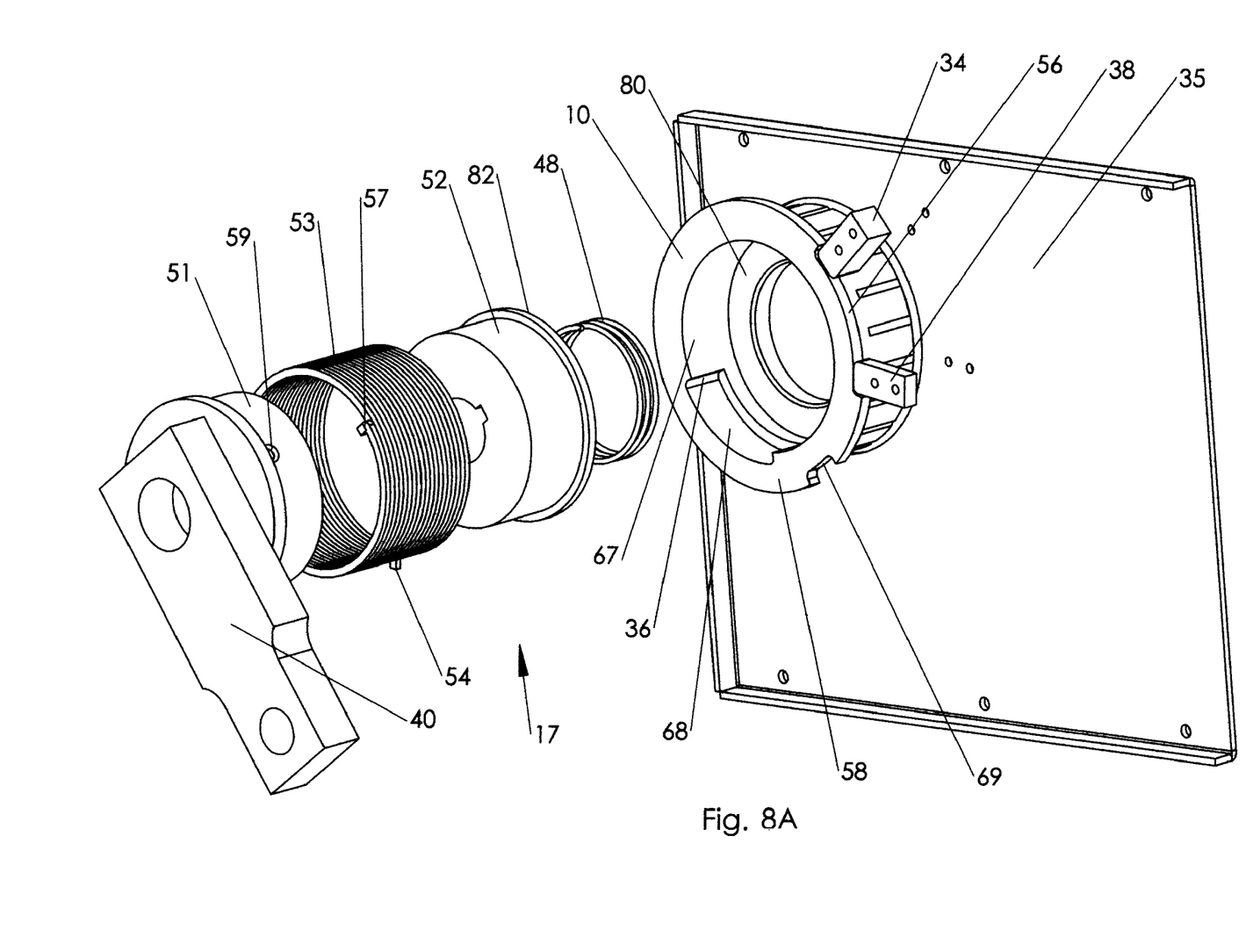
FIG. 8A is an exploded perspective view of the cover plate, release switch and wrap spring clutch of the invention.
Figure 9:
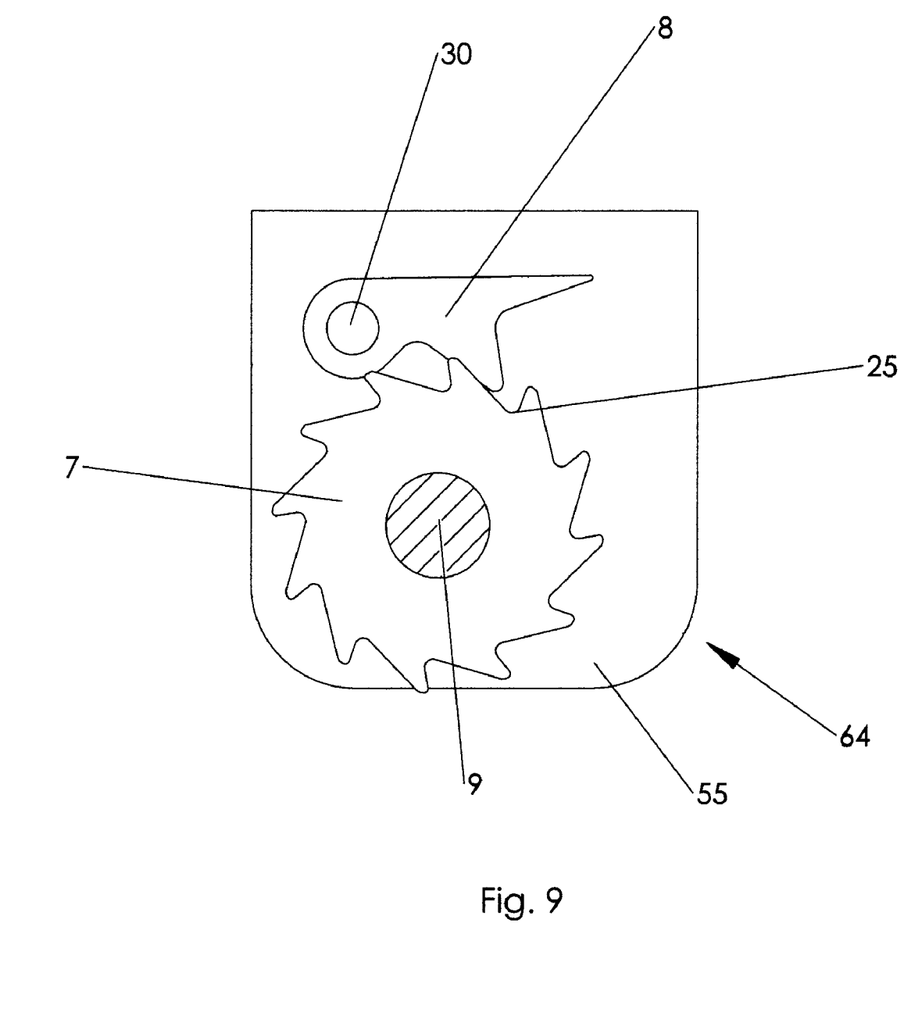
FIG. 9 is a sectional view taken along the line 9-9 shown in FIG. 4.

Torque linkage 60 will now be described with reference to FIGS. 5-9. The torque linkage 60 has a connector arm 11 and a wrap spring clutch 17. As best illustrated in FIGS. 7 and 8A, wrap spring clutch 17 comprises a driver hub 51, a driven hub 52, a wrap spring 53, and a clutch arm 40. Driver hub 51 is connected to clutch arm 40, which extends radially outward. The end of the piston rod 43 is connected to one end of the connector arm 11, the opposite end of the connector arm 11 being connected to the clutch arm 40, preferably by way of pin joints 12 or the like. Clutch arm 40 and hubs 51 and 52 each have a longitudinally disposed opening and are adapted to be fitted over a shaft 9, which in turn is connected to ratchet wheel 7 having teeth 4 as shown in FIG. 9. Preferably, the shaft 9 is permanently welded to the center of the ratchet wheel 7. The driven hub 52 is rigidly attached to shaft 9 by way of a key 20 inserted into keyholes 45 and 46. The driver hub 51 and clutch arm 40 are mounted on shaft 9 and freely rotatable (to the limits of their range of motion allowed by the connection to actuator 15) thereon. Wrap spring 53 has a connection tang 57 extending radially inward at one end and a release tang 54 extending radially outward at the opposite end. Connection tang 57 is fitted into an opening 59 in driver hub 51 (shown in FIG. 8A). When driver hub 51 is rotated so is tang 57, one direction causing the spring 53 to tighten contracting onto both hubs, and the other direction causing the spring 53 to loosen releasing the hubs. The driven hub 52 becomes engaged with the driver hub 51 when the wrap spring 53 contracts onto both hubs.

The wrap spring clutch 17 can transfer torque in one direction while freewheeling in the other. The wrap spring clutch 17 is equipped with a release switch 10 for manually disconnecting the two hubs 51 and 52 by activating the release tang 54 on the wrap spring 53. When the release tang 54 is activated, the wrap spring 53 expands and disengages the two hubs 51 and 52 thus allowing freewheeling of driven hub 52 and ratchet wheel 7.

Operation of the release switch will be described having reference to FIGS. 2, 6, 8 and 8A. The release switch 10 is preferably in the form of a hollow cylindrical dial fitted within an opening in cover plate 35 and about the wrap spring clutch 17. A spring 48 is located between the inner face 80 of the release switch 10 and the outer face 82 of driven hub 52, the spring 48 biasing the release switch away from the hub. Release switch 10 has a cylindrical radially extending flange 58. Flange 58 has a first circumferentially extending recessed groove 56 and a second circumferentially extending recessed groove 69. Release switch 10 also has a circumferentially extending recess 68 in the inner surface 67. When release switch 10 is fitted over wrap spring clutch 17, release tang 54 is positioned within recess 68, recess 68 being sized and dimensioned to allow release tang 54 free movement therein throughout the full range of motion of the wrap spring clutch 17.

Release switch 10 can be oriented in two positions: a tightening position and a release position. Positioning of the release switch is controlled by a pair of stoppers 34, 38 mounted on the inner surface of cover plate 35. Stopper 34 is thicker than stopper 38. The stoppers 34 and 38 are mounted to cover plate 35 in positions so as to correspond to groove 56. In the tightening position, when release switch 10 is outwardly displaced by spring 48, stoppers 38 and 34 seated within groove 56 prevent any rotation of the switch 10. In the tightening position as shown in FIG. 8, the release tang 54 is freely movable within recess 68 and thus the wrap spring 53 is able to engage the two hubs 51 and 52 and transfer a tightening torque to shaft 9 and ratchet wheel 7 when the actuator 15 is retracting. With the release switch in the tightening orientation, the wrap spring clutch 17 freewheels when the actuator is extending. To disengage the wrap spring clutch 17, the release switch 10 is pushed in (against spring 48) so as to free flange 58 from stopper 38 and rotated counter-clockwise (from the position shown in FIG. 8) to the release position (where groove 69 is engaged with stopper 38). Stopper 34 is sufficiently thick that the edges of groove 56 will come into contact with it even when the release switch is pushed in, thereby preventing over-rotation of the release switch 10, stopper 34 and groove 56 therefore defining the rotational range of motion of the switch 10. When release switch 10 is rotated to the release position, the edge 36 of recess 68 comes into contact with the release tang 54 forcing it to follow the circumferential path of edge 36 thereby expanding wrap spring 53 thus disengaging the two hubs 51 and 52 and allowing the driven hub 52, shaft 9 and ratchet wheel 7 to freewheel in both directions.

Operation of the tie down assembly will now be described. FIG. 5 shows a pair of trip mounts 31, 32 mounted to the underside of connector arm 11 at opposite ends. In the embodiment shown, the retract trip mount 31 is mounted towards the side of the connector arm proximal to the cover plate 35, while the extend trip mount 32 is mounted mid-way between the sides of the connector arm 11. The trip mounts are off-set in this manner to provide sufficient space for their mounting to the connector arm 11. This off-setting will not always be necessary depending on the size of the connector arm, and the trip mounts need only be mounted such that they can come into contact with valve lever 19.

The trip mounts 31, 32 determine and control the range of the linear motion of the actuator 15. Actual positioning of the trip mounts 31, 32 can be varied depending on the length of reciprocating action required. When the piston 41 is positioned at either end of travel, trip mount 31 or 32 toggles the valve lever 19 on the control valve 18 into one of two positions activating either extend or retract mode. Depending on which way the valve level 19 is toggled, the control valve 18 directs the pressurised flow of air entering through inlet port 23 from the air source 72 into the retract 65 or extend chamber 66 of the actuator 15 and exhausts the air from the opposite chamber through the appropriate exhaust port.

At the end of the extend phase, the retract trip mount 31 comes into contact with the valve lever 19 on the control valve 18, switching it from extend mode to retract mode. Movement of the valve lever 19 by the retract trip mount 31 causes pressurized air entering control valve 18 through inlet port 23 to be directed out through the retract port 27 to the retract chamber 65 of the actuator. At the same time, this movement of valve lever 19 by the retract trip mount causes extend chamber 66 to open to the outside atmosphere through exhaust port 6 on control valve 18 thereby exhausting any pressurized air contained therein. The pressure builds inside the retract chamber 65 of cylinder 14 forcing the piston 41 towards the head wall 49, thereby retracting piston rod 43 into the cylinder 14.

The piston 41 and piston rod 43 continue to retract until the extend trip mount 32 triggers the valve lever 19 switching it from retract mode to extend mode. In extend mode, the valve lever 19 causes the pressurised air entering control valve 18 through inlet port 23 to be directed out through extend port 28. At the same time, this movement of valve lever 19 by the extend trip mount causes retract chamber 65 to open to the outside atmosphere through exhaust port 5 on control valve 18 thereby exhausting any pressurized air contained therein. The high pressure air entering the extend chamber 66 forces the piston 41 towards the head wall 47, thereby extending piston rod 43 until the retract trip mount 31 toggles valve lever 19 and the cycle repeats.

In the embodiment shown in the drawings, tightening of the winch occurs when the actuator is retracting. When piston 41 retracts, it pulls connector arm 11, which in turn pulls clutch arm 40 and rotates the wrap spring clutch 17 in a tightening direction. The wrap spring clutch in turn rotates the shaft 9, which forces the ratchet wheel 7 to rotate with the wrap spring clutch 17. The clutch 17 continues to rotate until the extend trip mount 32 is triggered. Concurrently a pawl 8 connected by pin 30 to the existing winch 64, is engaged in the dedendum section 25 of a tooth 4 on the ratchet wheel 7 as shown in FIG. 8. In this configuration the pawl 8 resists the unloading motion of winch 64. Since the ratchet wheel 7 is held in this position by pawl 8, the clutch 17 is free to rotate (freewheel) in a loosening direction without unloading the stored torque in the winch 64. The actuator 15 extends to its fullest position as set by the positioning of the retract trip mount 31 and resets itself for the cycle to continue when the retract mount 31 triggers the valve lever 19.

The cycle continues until such time as an equilibrium state is reached. In this state the driving force from the actuator 15 and corresponding torque developed on the winch 64 are equalized by the force and corresponding torque developed by the resistance in the tie down 70, which is wrapped about spool 50. This state of equilibrium results in no further motion in the system until such time as the input torque is larger than the resistance torque. During transit, slack is often developed in the tie down 70 that would cause the resistance torque to drop and the system to once again re-tighten the tie down 70 to equalize the torques. In this fashion the system is continuously applying a tightening torque on the winch 64.

Should the operator wish to loosen the tie down, they need only disengage the pawl 8 and move the release switch 10 from the tightening position to the release position. However, because moving release switch 10 to the release position disengages the driver hub from the driven hub (which has the equalizing resistance torque), it is preferred that the operator first shut down the system by closing control valve 21 using valve lever 44, then disengage pawl 8 followed by moving release switch 10 to the release position. If the control valve 21 is not closed, the actuator will continue actuating, as there is no longer a resistance torque. When the release switch 10 is switched from tightening to release, the wrap spring clutch 17 is disengaged thereby allowing the ratchet assembly 64 to be loosened either through the tension in the tie down or manually. The system depressurises slowly after closing control valve 21 allowing the user enough time to manually lift the pawl pin out of the way.

The amount of applied torque can be adjusted to accommodate different cargo. This adjustment is made by manual modification to a regulator 24 (shown in FIG. 10) that controls the amount of pressure input to the main actuator 15. A gauge 22 is connected to each regulator 24 so that the operator can determine the desired pressure. Preferably, each tie down assembly 2 connected to the system has its own regulator 24 such that the applied torque can be individually set for each tie down assembly 2. This allows for the safe transport of various cargo and loading configurations on the same trailer. Alternatively, the system can be equipped with a single master regulator and gauge for controlling the desired pressure.

The present invention acts to ensure that each retaining element will be tightened to the pre-set tension and will maintain the tension by taking in any slack that develops, this tension being regulated by the pressure. The device is able to accommodate for changes in climate during transit; for example, an increase in temperature causing the strap to expand such that slack develops. The system of the invention will sense this and tighten the strap to the pre-set tension.

The clutch system and release of the invention allow for the easy release of tension in a given retaining element. The housing provides a cover to protect the various elements of the tie down assembly housed therein from rocks, dirt and the like tossed up by the wheels of the carrier and from the elements. The pneumatic system provides a self-contained automatic system for tightening the tie downs.

It will be appreciated by those skilled in the art that the preferred and alternative embodiments have been described in some detail but that certain modifications may be practiced without departing from the principles of the invention.

What is claimed is:

1. A self-tensioning tie down assembly for use in automatically tightening a retaining element on a winch securing cargo on a carrier comprising:

a mounting bracket connected to said carrier adjacent to said winch;

an actuator having an extended and retracted positions, said actuator being mounted to said bracket and when powered providing reciprocating linear motion between said extended and retracted positions;

a power source for actuating said actuator; and a linkage, said linkage comprising a connector arm and a wrap spring clutch, said connector arm connected to said actuator at one end and to said wrap spring clutch at an opposite end, said wrap spring clutch being connected to said winch, said linkage transmitting a tightening torque to said winch when actuated by said actuator.

2. The assembly of claim 1 wherein said winch includes a spool, a ratchet wheel and a pawl, said wrap spring clutch being connectable to a shaft connected to said ratchet wheel of said winch.

3. The assembly of claim 2 wherein the wrap spring clutch comprises a driver hub, a driven hub, a wrap spring and a clutch arm.

4. The assembly of claim 3 wherein said clutch arm having a first end and a second end opposite said first end, said first end being connected to said driver hub and said second end being connected to said connector arm.

5. The assembly of claim 4 wherein said wrap spring being connected to said driver hub and seated about said driver hub and said driven hub, said spring tightening about said driven hub when said driver hub is rotated in a tightening direction such that said driven hub is engaged by said driver hub.

6. The assembly of claim 5 wherein said driver hub being mounted on and freely rotatable about said shaft.

7. The assembly of claim 2 wherein said actuator comprises a piston in a cylinder, said piston having a rod connected to said linkage, said actuator being actuated by pneumatic pressure, delivery of said pneumatic pressure to said cylinder being controlled by a control valve, said control valve having a valve lever movable back and forth from a first position to a second position, said first position corresponding to an extend mode for said actuator and said second position corresponding to a retract mode for said actuator.

8. The assembly of claim 7 further comprising a pair of trip mounts mounted on said connector arm, said trip mounts adapted to toggle said valve lever between said first and second positions.

9. The assembly of claim 1 wherein said actuator comprises a piston in a cylinder, said piston having a rod connected to said linkage, said actuator being actuated by pneumatic pressure, delivery of said pneumatic pressure to said cylinder being controlled by a control valve.

10. The assembly of claim 9, wherein said control valve having a valve lever movable back and forth from a first position to a second position, said first position corresponding to an extend mode for said actuator and said second position corresponding to a retract mode for said actuator.

11. The assembly of claim 10 further comprising a pair of trip mounts mounted on said connector arm, said trip mounts adapted to toggle said valve lever between said first and second positions.

12. The assembly of claim 11 wherein said power source comprises a source of pressurized air and a control for controlling delivery of said pressurized air to said control valve.

13. The assembly of claim 12 wherein a pressure regulator is adjustable and controls a tension applied to said retaining element.

14. The assembly of claim 13 wherein said actuator continues its reciprocating linear motion until a state of equilibrium is reached between the tension applied to said retaining element and a pressure to said actuator.

15. The assembly of claim 5 further comprising a switch, said switch acting on said wrap spring clutch and movable to a tightening or a release position.

16. The assembly of claim 15 wherein when said switch being moved to said release position, said wrap spring being forced to expand thereby disengaging said driven hub.

* * * * *